(12) United States Patent
Song et al.

(10) Patent No.: US 11,310,391 B2
(45) Date of Patent: Apr. 19, 2022

(54) JAM DETECTION OF IMAGE FORMING APPARATUS BASED ON SIZES OF MOTOR CURRENTS MEASURED IN MULTIPLE INTERVALS

(71) Applicant: HEWLETT-PACKARD DEVELOPMENT COMPANY, L.P., Spring, TX (US)

(72) Inventors: Minkeun Song, Suwon-si (KR); Kiho Park, Suwon-si (KR); Yong-Ho You, Suwon-si (KR); Hyoungil Kim, Suwon-si (KR)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/051,959

(22) PCT Filed: Jul. 5, 2019

(86) PCT No.: PCT/US2019/040709
§ 371 (c)(1),
(2) Date: Oct. 30, 2020

(87) PCT Pub. No.: WO2020/027983
PCT Pub. Date: Feb. 6, 2020

(65) Prior Publication Data
US 2021/0120143 A1 Apr. 22, 2021

(30) Foreign Application Priority Data

Jul. 31, 2018 (KR) .................... 10-2018-0089307

(51) Int. Cl.
*H04N 1/32* (2006.01)
*H04N 1/00* (2006.01)

(52) U.S. Cl.
CPC ....... *H04N 1/3263* (2013.01); *H04N 1/00037* (2013.01); *H04N 1/00039* (2013.01); *H04N 1/00716* (2013.01)

(58) Field of Classification Search
None
See application file for complete search history.

(56) References Cited

U.S. PATENT DOCUMENTS 3,778,051 A 12/1973 Allen
4,798,646 A 1/1989 Sumi
(Continued)

FOREIGN PATENT DOCUMENTS

JP 04261382 9/1992
JP 07295311 11/1995
(Continued)

*Primary Examiner* — Andrew H Lam
(74) *Attorney, Agent, or Firm* — Staas & Halsey LLP (57) ABSTRACT

An image forming apparatus is provided. The image forming apparatus includes a print engine to be used to perform an image forming job, a motor to start the print engine, a driving circuit to supply a power to the motor and to include a sensor to sense a size of current of the power supplied to the motor during an operation to perform the image forming job, and a processor to detect an occurrence of jam based on a size of current sensed by the sensor in a first time interval while the motor is driven and a size of current sensed by the sensor after a determined time from the first time interval.

15 Claims, 9 Drawing Sheets

(56) References Cited

U.S. PATENT DOCUMENTS

| | | | |
|---|---|---|---|
| 5,971,392 A | 10/1999 | Lee | |
| 6,722,754 B1 * | 4/2004 | Delaney | ............... B41J 11/006 347/19 |
| 2017/0269535 A1 | 9/2017 | Suzuki et al. | |
| 2019/0033771 A1 * | 1/2019 | Sakai | .................... G03G 15/80 |

FOREIGN PATENT DOCUMENTS

| | | |
|---|---|---|
| JP | 2003238005 | 8/2003 |
| JP | 2006330506 | 12/2006 |
| JP | 2008139411 | 6/2008 |
| JP | 2009203069 | 9/2009 |
| JP | 2010001159 | 1/2010 |
| JP | 201325196 | 2/2013 |
| KR | 1020170111129 | 10/2017 |

* cited by examiner

JAM DETECTION OF IMAGE FORMING APPARATUS BASED ON SIZES OF MOTOR CURRENTS MEASURED IN MULTIPLE INTERVALS

CROSS REFERENCE TO RELATED APPLICATIONS

This application is filed under 35 U.S.C. 0.371 as a National Stage of PCT International Application No. PCT/US2019/040709, filed on Jul. 5, 2019, in the U.S. Patent and Trademark Office, which claims the priority benefit of Korean Patent Application No. 10-2018-0089307, filed on Jul. 31, 2018, in the Korean Intellectual Patent Office. The disclosures of PCT International Application No. PCT/US2019/040709 and Korean Patent Application No. 10-2018-0089407 are incorporated by reference herein in their entireties.

BACKGROUND

An image forming apparatus is an apparatus which performs generation, printing, reception, and transmission of image data, and representative examples thereof may be a printer, a copy machine, a facsimile, and a multifunction peripheral (MFP) in which functions of the above-described devices are combined.

In recent years, to detect an occurrence of jam, an image forming apparatus has a sensor installed therein for sensing whether an input paper is discharged, or the image forming apparatus may detect a size of current provided to a motor for operating a printing apparatus.

BRIEF DESCRIPTION OF THE DRAWINGS

The same reference numerals are used to represent the same elements throughout the drawings.

DETAILED DESCRIPTION

One or more examples will be described below in greater detail with reference to the accompanying drawings. The examples described below may be modified and implemented in various different forms. In order to more clearly describe the features of the examples, a detailed description of known matters to those skilled in the art will be omitted.

Meanwhile, in the disclosure, a case in which any one feature is connected with the other feature includes a case in which the features are directly connected with each other and a case in which the parts are electrically connected with each other with other features interposed therebetween. Further, when a certain feature is stated as "comprising" a certain feature, unless otherwise stated, this means that the certain feature may include another feature, rather than foreclosing the same.

The term "image forming job" as used herein may mean various jobs related to the image (e.g., printing, scanning or faxing), such as forming an image or creating/storing/transmitting an image file. In addition, "job" may mean not only an image forming operation, but also a series of processes necessary for performing an image forming operation.

An image forming apparatus generally operates to print out print data generated at a terminal such as a computer onto a printing medium (or paper). An example of an image forming apparatus includes a copier, a printer, a facsimile and a multi function printer (MFP) that provides the combined functionality of at least two of the single apparatuses. The image forming apparatus may refer to all apparatuses capable of performing an image forming operation, such as a printer, a scanner, a fax machine, an MFP, a display apparatus, or the like.

In addition, "print data" may refer to data that is converted into a format printable in a printer. Meanwhile, if a printer supports direct printing, the file itself may be print data.

In addition, "user" may refer to a person who performs an operation related to an image forming operation using an image forming apparatus or a device connected to the image forming apparatus via wire or wirelessly. In addition, "manager" may refer to a person who has the authority to access all functions and the system of the image forming apparatus. The "manager" and the "user" may be the same person.

Figure 1:
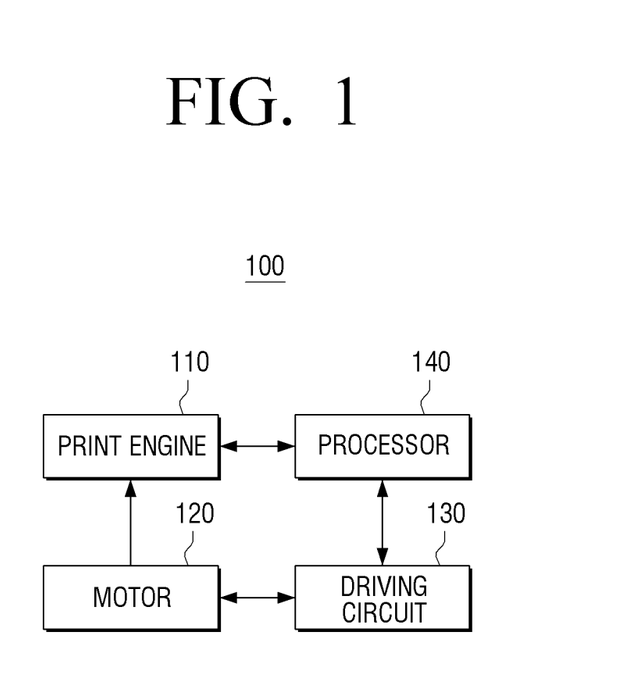
FIG. 1 is a block diagram illustrating a brief configuration of the image forming apparatus, according to an example.

FIG. 1 is a block diagram illustrating a brief configuration of an image forming apparatus, according to an example.

Referring to FIG. 1, an image forming apparatus 100 may include a print engine 110, a motor 120, a driving circuit 130, and a processor 140.

The print engine 110 may perform an image forming job. Specifically, the print engine 110 may perform the image forming job under the control of the processor 140 and the start of the motor 120. The detailed configuration of the print engine 110 will be described later with reference to FIG. 3.

The motor 120 starts the print engine 110. For example, the motor 120 may be included within the image forming apparatus 100, and may include a DC motor, a step motor, and a brushless DC (BLDC) motor. The motor 120 may perform various functions of the image forming apparatus, such as driving an organic photo conductor (OPC) in the print engine 110, driving a fuser, and transferring a printing medium. Although FIG. 1 illustrates only one motor, in examples, a plurality of motors may be included in the image forming apparatus 100.

The driving circuit 130 may generate a driving signal with respect to the motor 120 according to a driving command. In addition, the driving circuit 130 may provide a predetermined power to the motor 120. For example, when the motor 120 is a step motor, the driving circuit 130 may receive the driving command (for example, current magnitude information and speed information), provide a constant current to the step motor in response to the received current magnitude information, and provide an impulse driving signal corresponding to the speed information to the step motor. In addition, when the motor 120 is a BLDC motor, the driving circuit 130 may receive speed information, provide a predetermined constant voltage to the BLDC motor, and provide a driving signal corresponding to the received speed information to the BLDC motor. The detailed configuration and operation of the driving circuit 130 will be described later with reference to FIG. 5.

In addition, the driving circuit 130 may sense a size of current provided to the motor. For example, the driving circuit 130 may output current data which indicates a size of current sensed at predetermined time intervals. In addition, the output current data may be converted to a digital signal of N bits through an Analog Digital Converter (ADC) port (or terminal).

The processor 140 controls the respective configurations in the image forming apparatus 100. Specifically, when print data is received from a print control terminal apparatus, the processor 140 may control the print engine 110 to print the received print data, and transmit a driving command for the motor 120 that starts the print engine 110 to the driving circuit 130. For example, the processor 140 may transmit the driving command for the motor 120 such as a rotation start/stop, acceleration/moderation, velocity reference value command and the like to the driving circuit 130.

In addition, when a motor 120 is a step motor, the processor 140 may provide, to the driving circuit 130, a current reference value (Vref) (hereinafter referred to as 'constant current control value') as a driving command so that a predetermined constant current is provided to the step motor. In this regard, the constant current control value may be in the form of a pulse-width modulation (PWM) signal.

In addition, when a motor 120 includes a brake member, the processor 140 may provide an operation command of the brake member as a driving command to the driving circuit 130.

In addition, the processor 140 may detect an occurrence of jam based on current data transformed to a digital signal of N bits through an analog to digital (ADC) port.

In detail, the processor 140 may detect an occurrence of jam using current data for a size of current measured during a first interval and current data for a size of current measured during a second time interval which occurs a predetermined time after the first time interval from among the entire current data. A length of each of the first time interval and the second time interval may be a length appropriate for sensing an occurrence of jam based on the measured current sizes, which may be determined as a result of repeated experiments.

The processor 140 may detect an occurrence of jam using current data for a size of current measured during the two time intervals mentioned above, thereby more clearly identifying an actual occurrence of jam, as compared with a case where only current data measured in a single time interval is used according to the related art.

The first time interval may be set at predetermined time intervals after the motor 120 starts operating. For example, a large amount of current is supplied during an initial operation of the motor 120. So as not to sense a phenomenon of an initial sudden current increase as indicating that a jam has occurred, the first time interval may be set after elapse of a time required for the motor 120 to start operating and enter into a time interval of maintaining a stable speed.

Alternatively, the first time interval may be set based on a particular operation of the print engine 110 with respect to the movement of a printing medium in the print engine 110. For example, the first time interval may be set as, when the print engine 110 performs an operation of picking up a printing medium, a time interval after a predetermined time based on a time point of pickup.

As another example, the first time interval may be set as, when the print engine 110 performs an operation of moving a picked-up a printing medium to a transferring apparatus, a time interval after a predetermined time based on a start time point of movement. As another example, the first time interval may be occurred as an interval after a predetermined time based on a transmission time point of control signals for a clutch transferring driving power to a plurality of rollers in the print engine 110, a solenoid within the clutch, an exposure signal of an exposure apparatus, etc. Meanwhile, a particular operation of the print engine 110 described above is not limited to the above-described examples.

As another example, the first time interval may be set based on a sensing time point of a sensor capable of sensing a front part of a printing medium within the print engine 110. For example, the first time interval may be an interval after a predetermined time based on a sensing time point of a front part of the printing medium of a feed sensor or registration sensor capable of sensing a front part of the printing medium within the print engine 110.

In addition, the first time interval may be set at a position where the possibility that a size of sensed current will be increased due to an actual jam, to distinguish a case of a load increase due to increase of a thickness of a printing medium or a load increase due to deterioration of the motor 120 from a case of a jam. A position where the possibility that an actual jam will occur may be identified through repeated experiments.

In detail, when a size of current sensed in the second time interval is larger than a size of current during a normal operation, the processor 140 may identify a size of current sensed in the first time interval and identify whether an increase of a size of current in the second time interval is caused by an increase of a thickness of a printing medium or a load increase due to deterioration of the motor 120.

For example, when a sensed current size in the first time interval increases and it is identified that the increment corresponds to an increment due to an increase of a thickness of a printing medium, the processor 140 may identify an occurrence of jam by identifying whether an increment of a size of current sensed in the second time interval corresponds to an increment of a size of current due to an increase of a thickness of the printing medium.

The second time interval may be set at a position where it is identified that a size of current increases when an actual jam occurs. The position where a size of current increases when an actual jam occurs may be identified through repeated experiments. For example, to detect various jams that may occur from after a printing medium has passed through a fuser, the second time interval may be set as an interval after a time point at which a printing medium input to the print engine starts passing through the fuser.

As described above, the first time interval may be disposed in an interval in which the chances of jam are low and it may be accordingly identified that an increase of a size of current is caused by other factors than jam. In addition, the second time interval may be disposed in an interval in which the possibility of increasing a current when an actual jam occurs is high, and disposed in an interval capable of sensing an occurrence of jam. Meanwhile, positions of the first and second intervals are not limited to the examples described above.

The processor 140 may detect an occurrence of jam by comparing a size of current sensed in the first time interval and a size of current sensed in the second time interval with a size of current during a normal operation.

In detail, in a case in which values of sizes of current sensed in the first time interval and values of sizes of current sensed in the second time interval exceed a predetermined value as compared with a size of current during a normal operation, it may be identified that a jam has occurred.

In addition, the processor 140 may identify that a jam has occurred, even in a case in which values of sizes of current sensed in the first time interval do not exceed a predetermined value as compared with a size of current during normal operation, but values of sizes of current sensed in the second time interval exceed a predetermined value as compared with a size of current during normal operation.

In this case, when the processor 140 may identify that a jam did not occur when a printing medium passes by a position corresponding to the first time interval, but that a jam occurred when the printing medium passes by a position corresponding to the second time interval thereafter.

In addition, the processor 140 may calculate an average value of sizes of current sensed in the first time interval and an average value of sizes of current sensed in the second time interval, and apply the method described above, in the same manner.

In addition, in a case in which values exceeding a predetermined value as compared with a size of current during a normal operation from among the values of sizes of current sensed in the first time interval and values of sizes of current sensed in the second time interval occupy greater than or equal to a predetermined ratio from among the entire current size values of each interval, the processor 140 may identify that a jam has occurred. This is for the purpose of preventing the processor 140 from misjudging that a jam has occurred even in a case where a large size of current is temporarily measured.

In addition, even if values of size of current sensed in the first time interval do not exceed a predetermined value, when a ratio of values exceeding a predetermined value, which is greater than a size of current during a normal operation among the entire current size values of each time interval is greater than or equal to a predetermined ratio, the processor 140 may identify that a jam has occurred.

In addition, the processor 140 may calculate a fluctuation ratio of an average value of sizes of current sensed in the first time interval for a size of current during a normal operation and a fluctuation ratio of an average value of sizes of current sensed in the second time interval for a size of current during a normal operation, and if each of the fluctuation ratios exceeds a predetermined value, identify that a jam has occurred.

For example, in a case in which an average value of sizes of current sensed in the first time interval and the second time interval increases by more than 15% as compared with a size of current during a normal operation, the processor 140 may identify that a jam has occurred.

In addition, even if a fluctuation ratio of an average value of the first time interval does not exceed a predetermined value, when a fluctuation ratio of an average value of the second time interval exceeds the predetermined value, the processor 140 may identify an occurrence of jam.

Meanwhile, the size of current during a normal operation which is a reference for identifying a jam occurrence may be differently set for each of the first time interval and the second time interval.

In addition, the processor 140 may detect an occurrence of jam based on a difference between an average value of the first time interval and an average value of the second time interval. In detail, in a case in which a difference between an average value of the first time interval and an average value of the second time interval exceeds a predetermined value, the processor 140 may identify that a jam has occurred. In contrast, in a case in which a difference between an average value of the first time interval and an average value of the second time interval does not exceed a predetermined value, the processor 140 may identify that a jam has not occurred.

In a case in which it is identified that a jam has not occurred, the case may be a case where a currently-input printing medium is so thick that a size of current increases, or a case where a size of current increases due to the increase of load as the motor 120 is deteriorated. In a case in which currently-input printing medium is thick, or a load increases due to deterioration of the motor 120, the reason is that an increase amount of sizes of a current in the first time interval is similar to an increase amount of sizes of current in the second time interval.

As described above, in a case in which the processor 140 detects an occurrence of jam based on a difference between an average value of the first time interval and an average value of the second time interval, it is possible to prevent a jam from being mistaken for cases in which currently-input printing medium is thick or the load is increased due to aging of the motor 120.

Meanwhile, a method of directly comparing a value of a size of current in a first time interval with a size of current in a second time interval to obtain the effect of preventing a jam from being mistaken for cases in which a currently-input printing medium is thick or the load is increased due to aging of the motor 120 is not limited to comparing an average value of the first time interval and that of the second time interval. For example, it is possible to detect an occurrence of jam according to whether a difference between a maximum value of a size of current in the first time interval and a maximum value of a size of current in the second time interval.

As another example, it is possible to compare a variance of a size of current in the first time interval with a variance of a size of current in the second time interval. In addition, it is possible to compare a difference between a maximum value and minimum value of a size of current sensed in the first time interval, or compare a difference between a maximum value and average value of a size of current sensed in the first time interval with a difference between a maximum value and average value of a size of current sensed in the second time interval.

In addition, the processor 140 may identify a thickness of a printing medium input to the print engine 110 based on a size of current sensed in the first time interval, and detect an occurrence of jam based on the identified a thickness of a printing medium and a size of current sensed in the second time interval.

In detail, a size of load increases as a thickness of a printing medium increases and thus, the processor 140 may identify a thickness of a currently-input printing medium by using a size of current sensed in the first time interval and information relating to a size of current corresponding to a thickness of a printing medium during a normal operation.

In addition, the processor 140 may detect an occurrence of jam by comparing a size of current measured during the second time interval of a normal operation corresponding to the identified thickness with a size of current a currently sensed current size in the second time interval.

In more detail, in a case in which it is identified that a currently-input printing medium is a thick paper based on a size of current sensed in the first time interval, the processor 140 may identify whether an increment of a size of current sensed in the second time interval corresponds to an increment of a size of current due to a thickness of the currently-input printing medium.

If the increment of a size of current sensed in the second time interval corresponds to an increment of a size of current due to a thickness of the currently-input printing medium, the processor 140 may identify that a jam has not occurred.

In contrast, in a case in which the increment of a size of current sensed in the second time interval corresponds to an increment of a size of current due to a thickness of the currently-input printing medium, the processor 140 may identify that a jam has occurred.

In addition, the processor 140 may identify a thickness of a printing medium input to the print engine 110 based on a size of current sensed in the first time interval, and detect an occurrence of jam based on a fluctuation ratio of sizes of current sensed in the second interval during a normal operation corresponding to the identified thickness In detail, in a case in which it is identified that a currently-input printing medium is a thick paper based on a size of current sensed in the first time interval, the processor 140 may identify an occurrence of jam by identifying whether an increment of the fluctuation ratio currently-sensed current in the second interval corresponds to an increment of a fluctuation ratio due to a thickness of currently-input printing medium.

In addition, the processor 140 may identify a thickness of a printing medium input to the print engine 110 based on a size of current sensed in the first time interval, and detect an occurrence of jam based on the identified thickness of the printing medium and a difference between an average value in the first time interval and an average value in the second time interval.

In detail, the processor 140 may identify a thickness of a currently-input printing medium based on a size of current sensed in the first time interval, and identify an occurrence of jam by identifying whether a difference between an average value of the first time interval and a difference of the second time interval corresponds to that due to a fluctuation of thickness of a printing medium.

In addition, in a case in which it is detected that a jam has occurred, the processor 140 may lower a fusing temperature of a fuser. For example, there may be a case where in a state in which the printing medium that has been the cause of jam is not removed, an operation command for the image forming apparatus 100 is input and warm-up of the fuser is required. In this case, heat is applied to a remaining printing medium due to a high fusing temperature and there may be a possibility that the image forming apparatus may be damaged due to heat of the remaining printing medium.

Accordingly, in a case in which it is detected that a jam has occurred, the processor 140 may store jam occurrence information. Thereafter, in a case in which a warm-up of a fuser is required, the processor 140 may identify the stored jam occurrence information, sensing whether a jam has occurred again in a state in which the possibility that the image forming apparatus 100 may be damaged due to heat of the remaining printing medium is reduced by lowering a fusing temperature of the fuser, and identify whether the remaining printing medium is removed.

In addition, in a case in which it is detected that a jam has occurred, the processor 140 may control the fuser not to be heated. This is also intended to prevent the possibility of the image forming apparatus 100 failure due to the heat of the remaining printing medium caused by the high fusing temperature in the state where the remaining printing medium, which is the cause of the jam, is not removed.

Accordingly, when it is detected that a jam has occurred, the processor 140 may store jam occurrence information. In a case in which an operation command in need of warm-up of a fuser is received thereafter, the processor 140 may control that the fuser is not heated and then, detect jam again and identify whether the remaining printing medium is removed.

In addition, in a case in which it is detected that a jam has occurred, the processor 140 may suspend driving of the motor 120. For example, when it is detected that a jam has occurred, the processor 140 may suspend an operation currently in progress.

In a case in which the processor 140 detects that a jam has occurred and thereafter, a print command is input, the processor 140 may identify that a cover of a main body of the image forming apparatus 100 is opened and closed at least once. If it is identified that the cover is opened and closed once, there is a possibility that the remaining printing medium which cause jam is removed and thus, the processor 140 may control the print engine 110 to perform an operation corresponding to the input print command. Meanwhile, the number of open and close of the main body cover is not limited to one.

In addition, in a case in which it is detected that an occurred jam is constantly unremoved, the processor 140 may automatically notify a management server (not illustrated) corresponding to a service center of the corresponding error.

In the above example, a current provided to one motor is sensed and it is determined whether a jam has occurred using a size of current sensed in the first time interval and the second time interval. However, a plurality of motors may be provided in the image forming apparatus 100. In this case, it is possible to sense each of currents provided to a plurality of motors and to identify an occurrence of a jam using the sizes of currents sensed in the first time interval and the second time interval.

In FIG. 1, the processor 140 identifies an occurrence of jam. In examples, it may also be configured such that the driving circuit 130 may identify an occurrence of jam, and that only when identifying that a jam has occurred, the driving circuit 130 may transfer information relating to the jam to the processor 140.

In addition, FIG. 1 illustrates that the motor 120 and the driving circuit 130 are separately configured. During implementation, however, the motor 120 may be implemented as a configuration in the driving circuit 130.

In addition, in FIG. 1, the processor detects an occurrence of jam using currents sensed in a total of two intervals. However, in an implementation, the processor may detect an occurrence of jam using currents sensed in three or more intervals.

Meanwhile, although the above illustrates and explains the simple constitution of the image forming apparatus, various new devices may be additionally included in actual implementation. It will be explained below by referring to FIG. 2.

Figure 2:
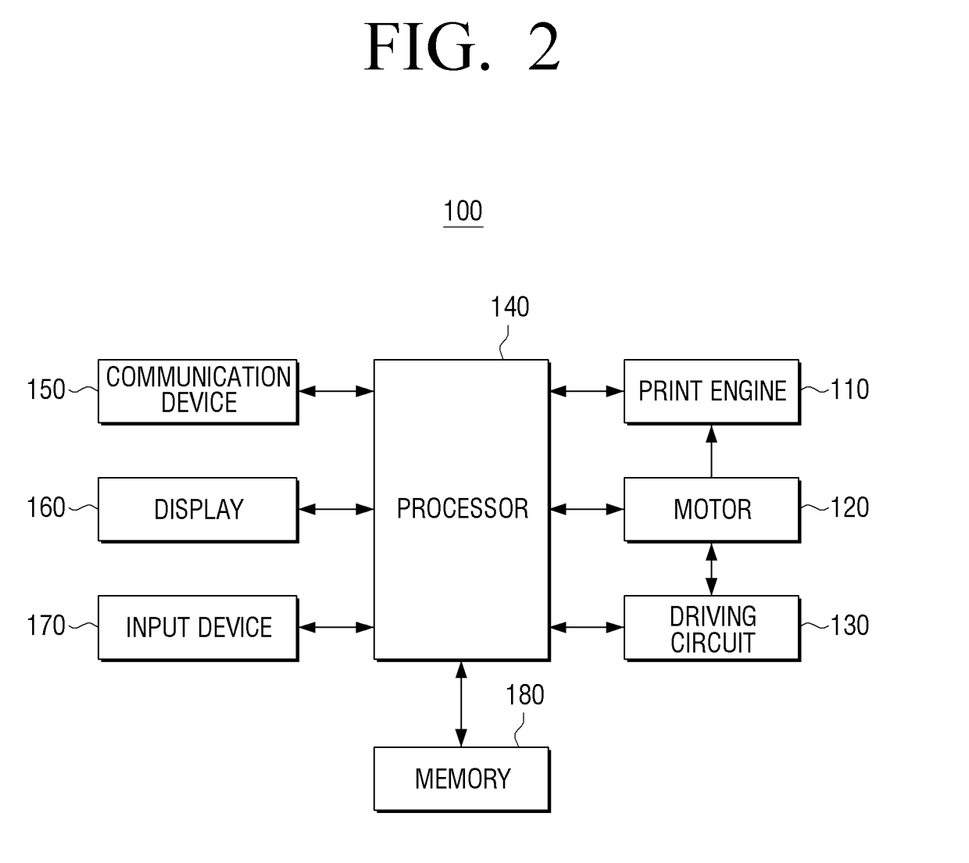
FIG. 2 is a block diagram illustrating a specific configuration of the image forming apparatus, according to an example.

FIG. 2 is a block diagram illustrating a specific configuration of the image forming apparatus according to an example.

Referring to FIG. 2, the image forming apparatus 100 according to an example may include a print engine 110, a motor 120, a driving circuit 130, a processor 140, a communication device 150, a display 160, an input device 170, and a memory 180.

The print engine 110, the motor 120, and the processor 140 perform the same function as those of FIG. 1, and thus, the description thereof will be omitted.

The communication device 150 may be connected to a print control terminal device (not illustrated), and receive print data from the print control terminal device. Specifically, the communication device 150 is formed to connect the image forming apparatus 100 to an external apparatus (not illustrated), and may be connected via not only a local area network (LAN) or the Internet but also a universal serial bus (USB) port or a wireless communication (e.g., Wi-Fi 802.11a/b/g/n, near field communication (NFC), or Bluetooth) port. In this regard, the print control terminal device may be a general PC or a laptop PC, and may be a mobile device such as a smart phone.

In addition, when a jam is occurred in the image forming apparatus 100, the communication device 150 may provide information relating to the jam to a management server (not illustrated) corresponding to a service center.

The display 160 may display various information provided by the image forming apparatus 100. For example, the display 160 may display an operation state of the image forming apparatus 100, or may display a user interface window for selecting functions and options that the user can select.

Further, the display 160 may display the operation state of the image forming apparatus 100. In addition, when a jam is occurred, the display 160 may display information including jam guide information, manual information for solving the jam, contact information (or how to contact) a service center, etc.

Further, the input device 170 may include a plurality of function keys with which the user may set or select various functions supported by the image forming apparatus 100. Through the above process, the user can input various driving commands with respect to the image forming apparatus 100.

The memory 180 may store print data. For example, the memory 180 may store print data that are received through the communication device 150 described above. The memory 180 may be implemented to be an external storage medium, a removable disk that includes a Universal Serial Bus (USB) memory, and/or a web server through a network as well as a storage medium within the image forming apparatus 100.

In addition, the memory 180 may store a lookup table usable to control the motor 120. Here, the lookup table may be an acceleration table having pulse cycle information for driving speeds of the step motor, and may be a speed (or acceleration) table corresponding to a plurality of load voltages (Vload), a lookup table for torque values that correspond to a plurality of load voltages (Vload), or a lookup table for constant current control voltages (Vref values or control voltage values) that correspond to the plurality of load voltages (Vload).

In addition, the memory 180 may store information that relates to a size of current provided to the motor 120 during a normal operation, and the information may be used to identify whether a jam has occurred or not. Accordingly, the processor 140 may detect an occurrence of jam by comparing current data sensed by the driving circuit 130 with the information relating to a size of current during normal operation stored in the memory 180.

The information relating to a size of current provided to the motor 120 during a normal operation may have different values for each first time interval or for each second time interval. In addition, the information relating to a size of current provided to the motor 120 during a normal operation may have different values for each thickness of an input printing medium and according to whether a load has simply increased due to aging. Accordingly, the processor 140 may distinguish a case of a load increase caused by a change of a thickness of a printing medium rather than jam or a case of a simple increase of load due to aging, and may prevent misjudgment that a jam has occurred.

In addition, the memory 180 may store current data which indicates a size of current sensed at predetermined time intervals by the driving circuit 130.

In the above example, the memory 180 may store information relating to a size of current provided to a motor 120 during a normal operation. However, in an implementation, the information relating to a size of current provided to the motor during the normal operation may be stored in the driving circuit 130 or the processor 140 which will be described later.

In related art, when current input to a motor is sensed and a jam is occurred, a processor detects an occurrence of jam using a size of current measured in a single time interval. In this case, however, there is a problem that the processor is not capable of clearly distinguishing a case of a simple increase of load due to a change of a thickness of a printing medium or aging from a case of an actual jam.

In contrast, as described above, the image forming apparatus 100 according to an example may detect an occurrence of jam using sizes of currents measured in two intervals disposed at time intervals and thus, a processor 140 may clearly distinguish a case a simple increase of load due to a change of a thickness of a printing medium or aging from a case of an actual jam.

Figure 3:
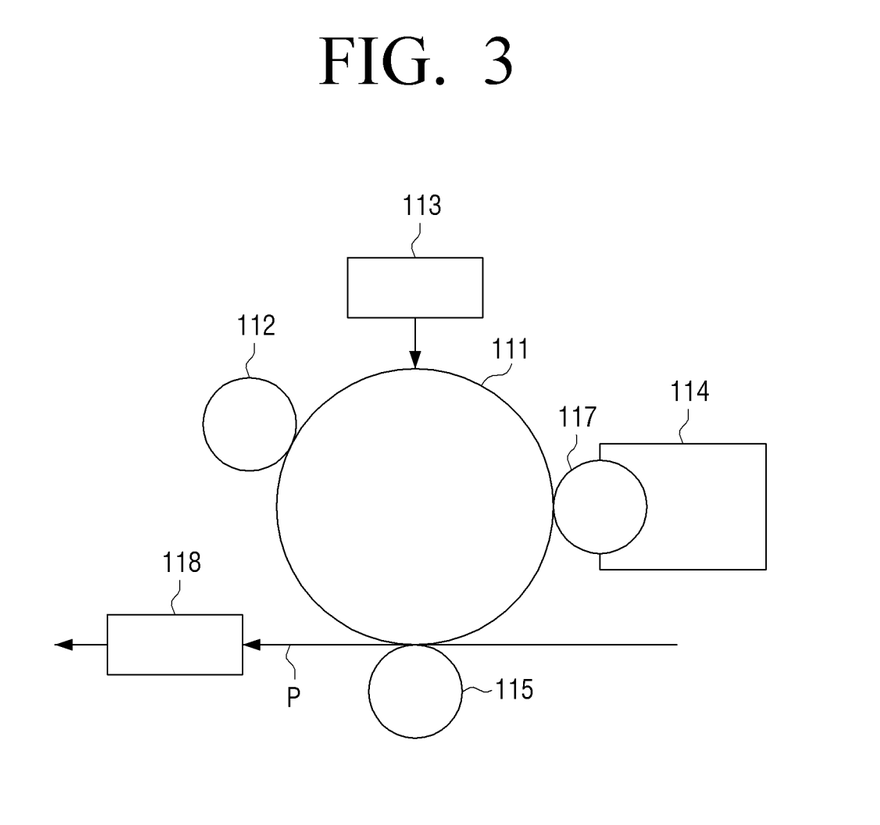
FIG. 3 is a diagram of the print engine of FIG. 1, according to an example.

FIG. 3 is a diagram of the print engine of FIG. 1, according to an example.

Referring to FIG. 3, the print engine 110 may include a photosensitive drum 111, a charger 112, an exposure apparatus 113, a developer 114, a transferring apparatus 115, and a fuser 118.

The print engine 110 may further include a feeder (not illustrated) which supplies a printing medium (P). An electrostatic latent image is formed on the photosensitive drum 111. The photosensitive drum 111 may be referred to as a photosensitive drum, a photosensitive belt, and the like, according to forms.

The charger 112 charges the surface of the photosensitive drum 111 to a uniform potential. The charger 112 may be implemented as a corona charger, a charging roller, a charging brush, and the like.

The exposure apparatus 113 may change the surface potential of the photosensitive drum 111 based on information on an image to be printed to form an electrostatic latent image on the surface of the photosensitive drum 111. The exposure apparatus 113 of this type may be referred to as a light scanning device or the like, and a Light Emitting Diode (LED) may be used as a light source.

The developer 114 accommodates a developing agent therein, and develops the electrostatic latent image into a visible image through supply of the developing agent onto the electrostatic latent image.

The visible image which is formed on the photosensitive drum 111 is irradiated to a recording medium (P) by the transferring apparatus 115 or an intermediate transfer belt (not illustrated). The transferring apparatus 115 may transfer the visible image to a printing medium, for example, by the electrostatic transfer method. The visible image is attached to the recording medium (P) by electrostatic attraction.

The fuser 118 fixes a visible image on the recording medium P by applying heat and/or pressure to a visible image on the recording medium P. The printing operation is completed by this series of processes.

Meanwhile, the motor 120 may perform an operation of rotating each configuration of the print engine 110 descried above. In examples, one motor 120 may simultaneously rotate a plurality of configurations of the print engine 110 described above. Alternatively, a plurality of motors in combination may rotate the plurality of configurations described above.

In the illustrated example, it is illustrated and described only a configuration directly related to image forming. However, the print engine 110 may further include a paper transferring apparatus 116 which moves printing mediums loaded in the loading container to the transferring apparatus and the fuser described above. The configuration of such a paper transferring apparatus will be described later with reference to FIG. 4.

Figure 4:
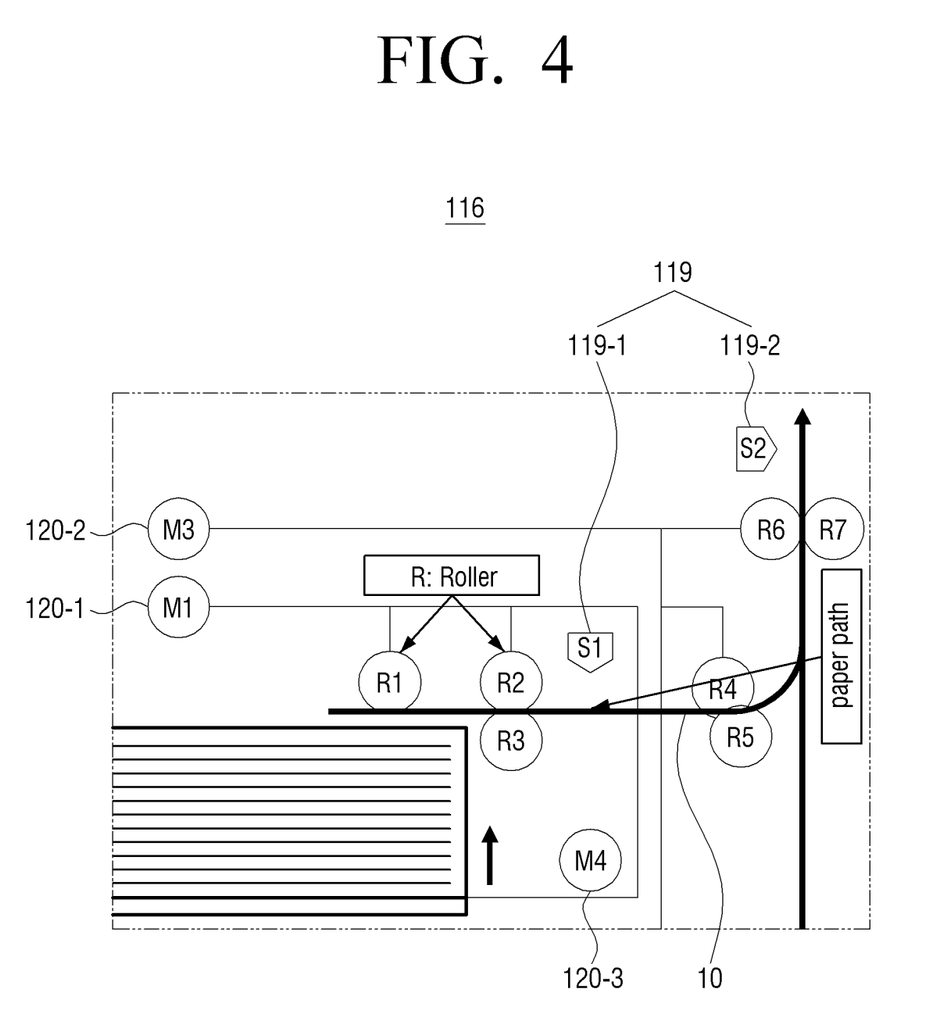
FIG. 4 is a diagram of a specific configuration of a paper transferring apparatus.

FIG. 4 is a diagram of a specific configuration of a paper transferring apparatus.

Referring to FIG. 4, the paper transferring apparatus 116 may move a printing medium loaded in a loading container to a predetermined paper transferring path. To this end, the paper transferring apparatus 116 may include a plurality of motors 120-1 (M1), 120-2 (M3) and 120-3 (M4) and structures R1, R2, R4 and R6, including any corresponding rollers R3, R5 and R7, that are movable by way of the plurality of motors 120-1, 120-2 and 120-3.

The plurality of motors 120-1, 120-2 and 120-3 provides power for activating a structure. For example, a first motor 120-1 drives a plurality of rollers R1 and R2 to put a manuscript loaded in a loading container in a paper transferring path.

In addition, a second motor 120-2 drives a plurality of rollers R4 and R6 to move printing mediums discharged from a loading container to the transferring apparatus and the fuser.

A third motor 120-3 raises the printing medium in the loading container to the upper end and activates an instrument for bringing the printing medium into contact with the roller R1.

Through the configuration described above, when a print command is received, the processor 140 may provide a driving command to the plurality of motors 120-1 and 120-2 to operate a driving speed corresponding to a printing speed.

Based on the driving command, the plurality of motors 120-1 and 120-2 drives the structures R1, R2, R4 and R6 and accordingly, printing mediums loaded in the loading container are moved to the transferring apparatus in the print engine 110.

Meanwhile, in related art, to identify an occurrence of jam, a paper sensor 119, for example, a paper sensor 119-1 (S1) and 119-2 (S2) disposed on the paper transferring path is used. When it is identified that a movement of a printing medium is sequentially sensed according to a signal output from the paper sensor 119-1 and 119-2, the processor 140 identifies that a jam has not occurred. However, such a paper sensor is difficult to install because it needs to be disposed on the movement path of the printing medium.

In addition, a method of identifying an occurrence of a jam by sensing a size of current supplied to the motor 120 and observing a change of load is used. However, in related art, it is identified whether a jam has occurred using current data for a size of current measured in a single time interval and thus, it is difficult to clearly distinguish cases of a temporary increase of a size of current, a simple increase of load due to a change of thickness of a printing medium or aging, etc. from an actual jam.

Meanwhile, in an example, it may be detected whether a jam has occurred using sizes of currents measured in two intervals disposed at time intervals and thus, it may be clearly distinguished between a case a simple increase of load due to a change of a thickness of a printing medium or aging from a case of an actual jam.

For example, while a printing medium is transferred from a loading container to a paper transfer path, when a jam in which the printing medium is rolled in a roller R2 occurs, a size of current provided to a first motor 120-1 may be increased by the jam.

In a case in which the first time interval is positioned in an interval in which the first motor 120-1 operates at a predetermined speed after a paper transfer operation started and the second time interval is positioned in an interval after a time point when a transferred printing medium starts passing through the roller R2, the processor 140 may identify that a size of current in the second time interval is increased.

The processor 140 may identify a size of current in the first time interval as well. In a case in which a size of current in the first time interval is similar to a size of current during operation, the processor 140 may identify an increase of a size of current in the second time interval as a result of jam.

In the above example, only the operation of the paper transferring apparatus disposed on the loading container side is described. However, the above-described operation may be applied on a moving path along which a printing medium in the print engine moves, for example, a path on which a printing medium input to a fuser is discharged outside.

Figure 5:
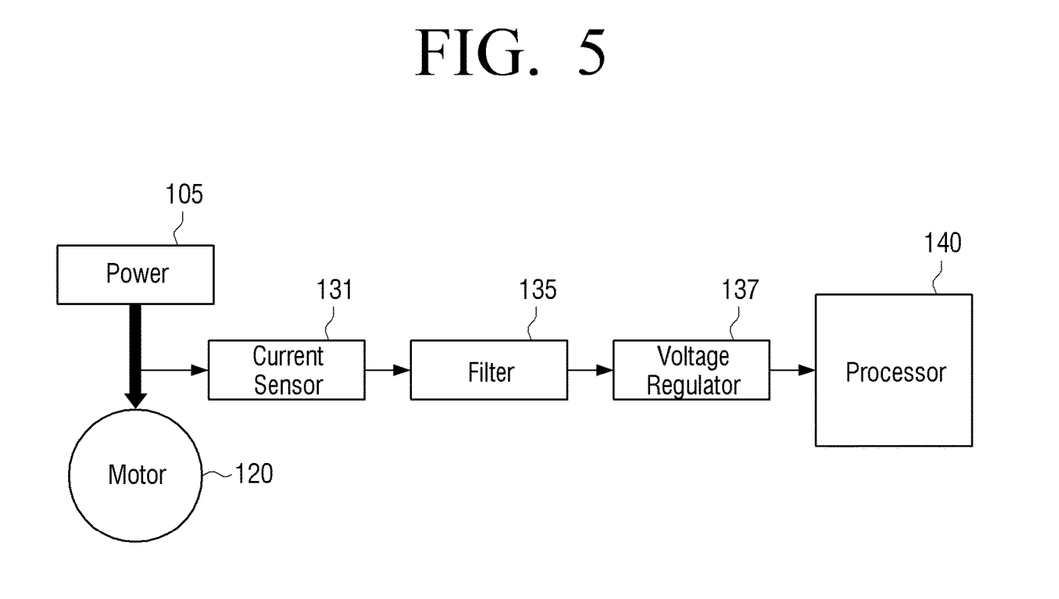
FIG. 5 illustrates a specific configuration of the driving circuit of FIG. 1.
Figure 6:
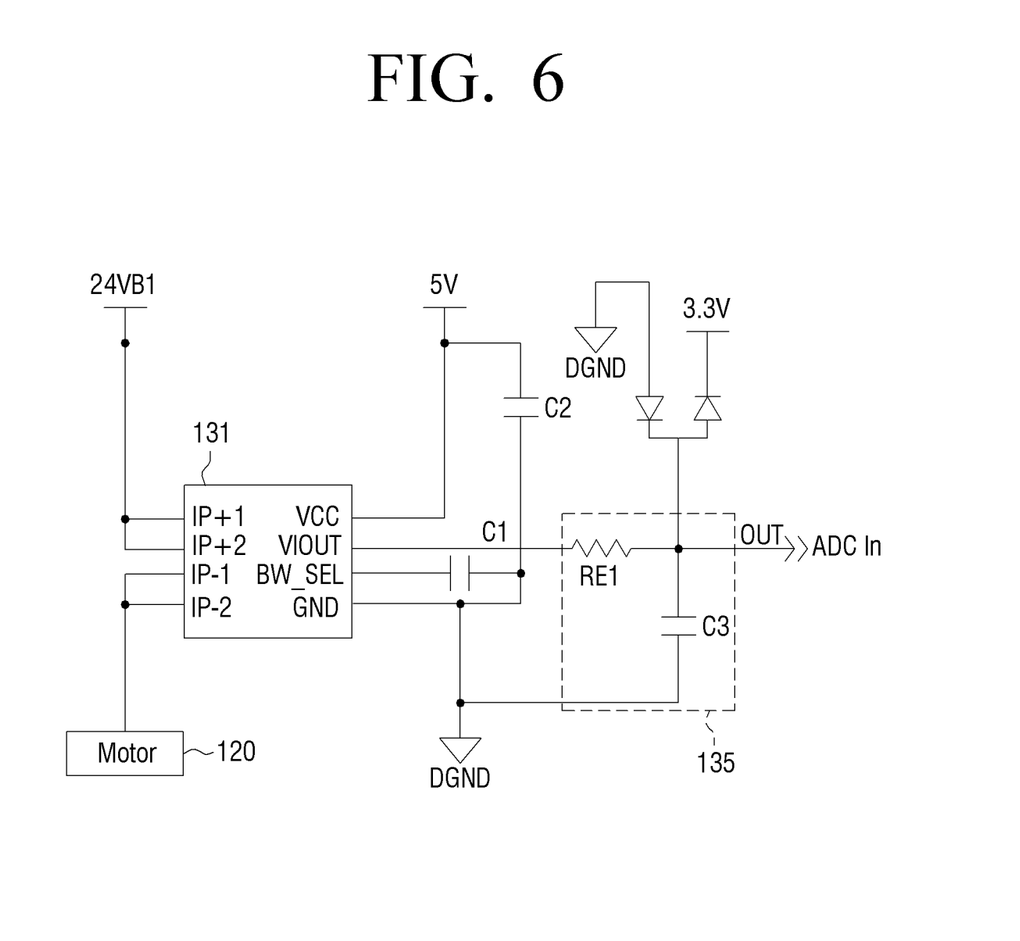
FIG. 6 is a diagram illustrating a circuit diagram of the current sensor and filter of FIG. 5.

FIG. 5 is a diagram illustrating a specific configuration of the driving circuit of FIG. 1. FIG. 6 is a diagram illustrating a circuit diagram of the current sensor and a filter of FIG. 5.

Referring to FIG. 5, the driving circuit 130 may include a current sensor 131, a filter 135, and a voltage regulator 137.

The current sensor 131 may sense a size of current provided to a motor 120 at predetermined time intervals. For example, the current sensor 131 may sense a magnetic field generated by a power provided from the power supply 105 to the motor 120, and output information relating to a size of current corresponding to the sensed magnetic field of a voltage size.

In addition, the current sensor 131 may sense a voltage of a Shunt resistance terminal by using a shunt resistance connected to one side of the motor 120. In addition, the current sensor 131 may output current data for a size of current to the filter 135.

The filter 135 may allow a pass-through of a frequency band to be sensed from among current data for a size of current sensed through the current sensor 131, and filter out the remaining frequency bands.

In detail, a current provided to the motor 120 basically includes a frequency component of the motor 120 itself and thus, it is possible to filter out a frequency band by means of the filter 135. The filter 135 may correspond to any one from among a low pass filter or a band pass filter.

The voltage regulator 137 may regulate a level of current data output from the current sensor so that the current data level matches a voltage level of an ADC port of the processor 140. For example, it is possible to regulate a voltage level of current data so that minimum and maximum ranges of a level of a signal of the output current data includes the voltage level of the ADC port. To this end, the amplification, reduction and level shift of a signal may be carried out.

Referring to FIG. 6, the power supply 105 may supply power to the motor 120 and the current sensor 131 may sense a current of power provided to the motor 120. That is, the current sensor 131 may be disposed on a power supply line between an output terminal of the power supply 105 and a power input terminal of the motor 120.

The current sensor 131 may output current data for the sensed current size to the filter 135. In addition, the filter 135 may filter out a frequency component of the motor 120 itself by using a low pass filter including a resistance RE1 and a capacitor C3.

The current data output from the filter 135 may be input to the ADC port (or terminal) of the processor 140 via the voltage regulator 137.

In FIG. 6, the current sensor 131 senses a size of current based on a magnetic field generated by a power supplied to a motor. However, in an implementation, it is possible to sense a size of current by using a shunt resistance.

In addition, in FIG. 6, the driving circuit 130 includes a current sensor 131 sensing a size of current. However, in an implementation, the current sensor 131 may be a current sensor separated from the driving circuit 130.

Further, in FIG. 6, the filter 135 utilizes a low pass filter. However, in an implementation, the filter 135 may use a band pass filter.

Figure 7:
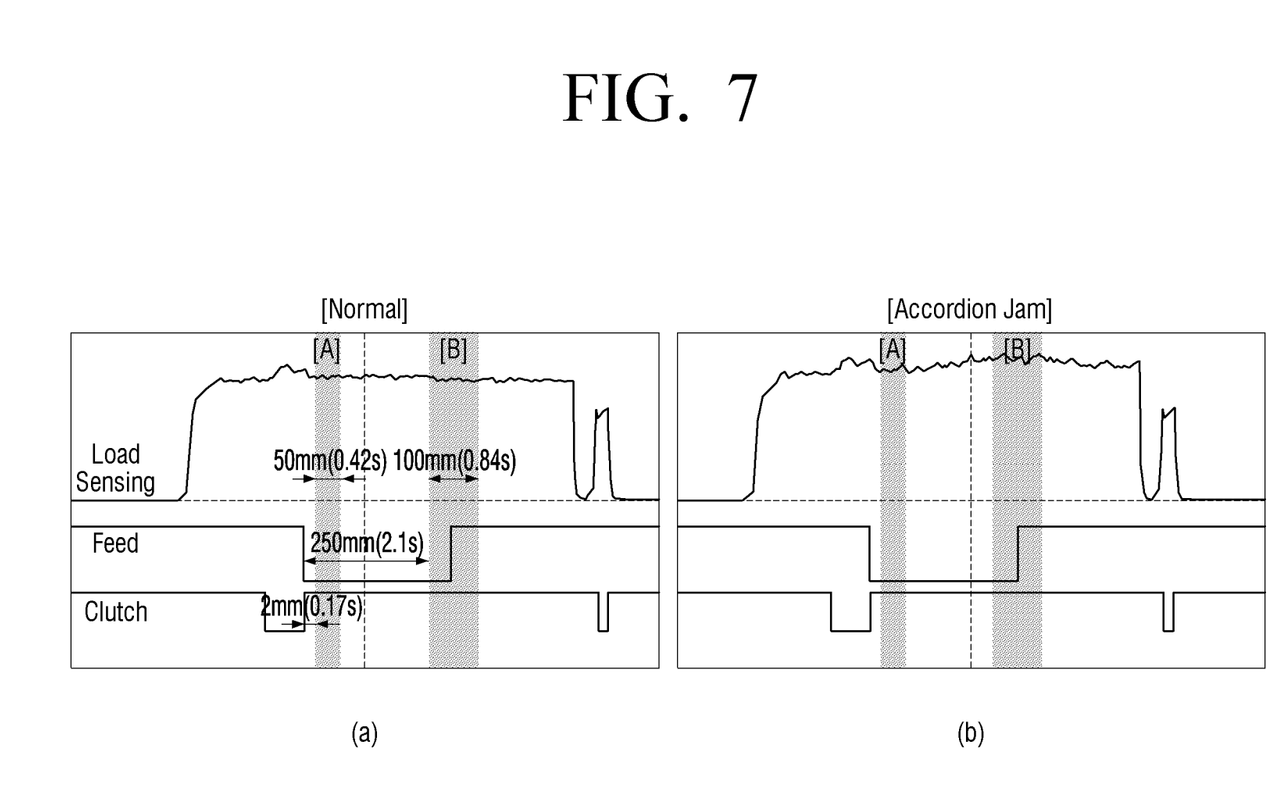
FIGS. 7 and 8 are diagrams provided to explain a method for identifying an occurrence of jam based on a size of a sensed current, according to various examples.
Figure 8:
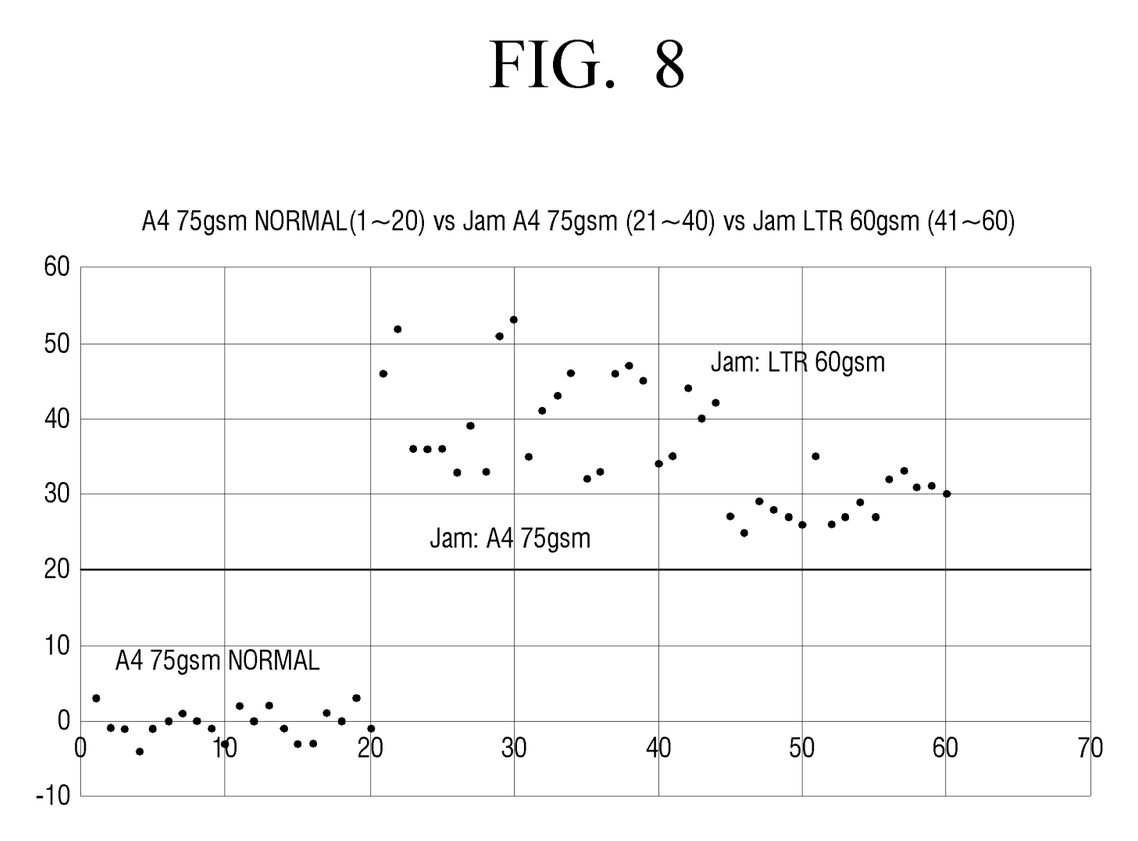

FIGS. 7 and 8 are diagrams provided to explain a method for identifying an occurrence of jam based on a size of a sensed current, according to various examples.

Referring to FIG. 7, it is possible to identify a size for each current measured during a normal operation and a size of current measured when a jam occurs. In FIG. 7, (a) illustrates an example size of a current sensed during a normal operation, and (b) illustrates an example size of a current sensed when a jam in which a printing medium is crumpled in an accordion form occurs.

Hereinafter, for convenience of explanation, it will be assumed in FIGS. 7 and 8 that determination of an occurrence of jam is made by sensing a size of current provided to a motor driving a fuser. Accordingly, a first time interval [A] may be an interval corresponding to a time point when a printing medium moves toward a fuser, and a second time interval [B] may be an interval corresponding to after a time point when a printing medium starts passing through a fuser.

Referring to FIG. 7, (a), it may be identified that a size of current measured in the first time interval [A] during a normal operation has a similar value to a size of current measured in the second time interval [B]. In contrast, referring to FIG. 7, (b), it may be identified that a size of current measured in the second time interval [B] is increased due to jam.

That is, when the first time interval [A] is set to an interval in which the possibility that a jam will occur is low, even if a jam occurs, a sensed current size in the first time interval [A] is not significantly different from a size of current a during normal operation. In addition, when the second time interval [B] is set to an interval in which it is anticipated that a size of current will increase when a jam occurs, a size of current in the second time interval [B] sensed when a jam occurs increases significantly compared with a size of current during a normal operation. The processor may detect a jam by using this characteristic.

For example, in a case in which both a size of current in the first time interval [A] and currently-sensed size of current in the second time interval [B] have increased, it is possible to identify whether an increase of a thickness of a printing medium or an increase of load due to aging is the cause of the increase of a size of current based on the size of current in the first time interval [A] currently sensed.

In a case in which it is identified that a size of current in the first time interval [A] has increased due to an increase of a thickness of a printing medium, etc., it is possible to compare a size of current in the second time interval [B] currently sensed with a size of current in the second time interval [B] during a normal operation which corresponds to a currently-identified printing medium thickness. In a case in which a size of current in the second time interval [B] currently sensed exceeds a predetermined value as compared with a size of current during a normal operation, it may be determined that a jam has occurred.

Referring to FIG. 8, a difference between an average value of a size of current in the first time interval for each circumstance and an average value of a size of current in the second time interval may be identified.

In detail, if an x value on the x-axis is in the range of 1 to 20, a corresponding y value on the y-axis corresponds to a difference value between average values of the first time interval and the second time interval measured when a printing medium is 75 gsm thick and during a normal operation. In addition, if an x value on the x-axis is in the range of 21 to 40, a corresponding y value on the y-axis corresponds to a difference value between average values of the first time interval and the second time interval measured when a printing medium is 75 gsm thick and a jam occurs. In addition, if an x value on the x-axis is in the range of 41 to 60, a corresponding y value on the y-axis corresponds to a difference value between average values of the first time interval and the second time interval measured when a printing medium is 60 gsm thick and during a normal operation.

Referring to FIG. 8, during a normal operation and if a printing medium is 75 gsm thick, it may be identified that a difference between average values of the first time interval and the second time interval has a value of approximately 0. In contrast, it may be identified that when a jam has occurred, a difference between average values of the first time interval and the second time interval exceeds 20 or more.

In detail, if a printing medium is 75 gsm thick, a difference between average values of the first time interval and the second time interval has a value of approximately 40. In contrast, if a printing medium is 60 gsm thick, a difference between average values of the first time interval and the second time interval has a value of approximately 30.

That is, it may be identified that a difference between sizes of current in the first time interval and the second time interval when a jam has occurred has a different value from a case during a normal operation, and that a difference between sizes of current in the first time interval and the second time interval has different values when a jam occurs. The processor may detect a jam by using these characteristics.

In detail, in a case in which a difference between a size of current in the first time interval currently sensed and a size of current in the second time interval currently sensed exceeds a predetermined value as compared with a difference between a size of current in the first time interval during a normal operation and a size of current in the second time interval during a normal operation, the processor may identify that a jam has occurred.

In addition, in a case in which information relating to sizes of current of the first and second time intervals during a normal operation according to a thickness of printing medium is secured, it is possible to identify a thickness of a current printing medium by using a currently-sensed current size in the first time interval. In addition, in a case in which a difference between a currently-sensed current size in the first time interval and a currently-sensed current size in the second time interval exceeds a predetermined value as compared with a difference between each size of current in the first time interval and the second time interval during a normal operation, it may be identified that a jam has occurred.

Meanwhile, in FIGS. 7 and 8, sizes of current sensed in the first and second time intervals during a normal operation are similar to each other. However, in an implementation, it is possible that the sizes of current sensed in the first and second time intervals during a normal operation may be different from each other.

In addition, in FIGS. 7 and 8, a method of sensing an occurrence of jam using a size of current sensed in the first time interval and a size of current sensed in the second time interval is not limited to the example described above.

Figure 9:
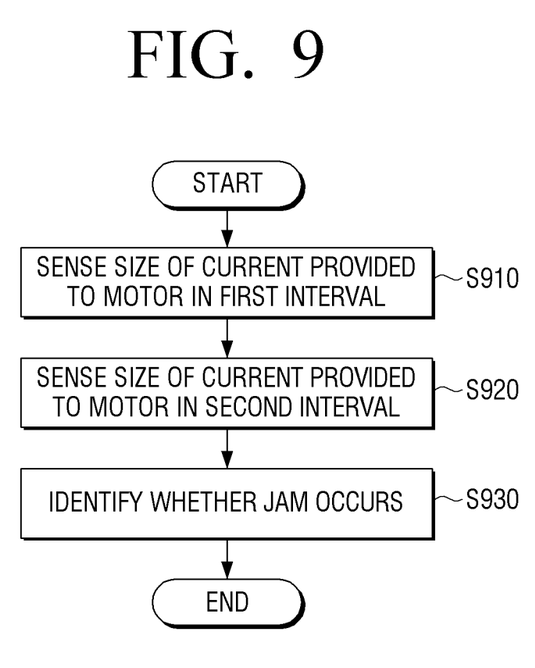
FIG. 9 is a flowchart provided to explain a control method, according to an example.

FIG. 9 is a flowchart provided to explain a control method, according to an example.

Referring to FIG. 9, a size of current provided to a motor starting a print engine in a first time interval while the motor is driven may be sensed at operation S910. In detail, it is possible to sense a size of current provided to the motor in the first time interval at predetermined time intervals using a current sensor. In addition, the first time interval may be set as an interval after a predetermined time after the motor started operating, or may be set based on a particular operation in relation to movement of a printing medium within the image forming apparatus.

In addition, when a predetermined time elapses, a size of current provided to the motor in the second time interval may be sensed at operation S920. The second time interval may be set at a position where it is identified that a size of current increases due to repeated experiments when an actual jam occurs, etc. For example, the second time interval may be set as an interval after a time point at which a printing medium input to the print engine starts passing through the fuser.

In addition, it may be identified an occurrence of a jam based on the size of current sensed in the first time interval and the size of current sensed in the second time interval, at operation S930.

In detail, it may be identified an occurrence of a jam by comparing a size of current during a normal operation with the respective current size sensed in the first time interval and current size sensed in the second time interval. For example, it may be identified whether a jam has occurred according to whether a difference between the respective a size of current in the first time interval and the second time interval and the sizes of current during a normal operation exceeds a predetermined value.

In addition, it may be identified whether a jam has occurred based on a ratio of an average value of sizes of current sensed in the first time interval to a current size during a normal operation and a ratio of an average value of sizes of current sensed in the second time interval to a size of current during a normal operation. For example, it may be identified whether a jam has occurred according to whether the respective ratios of the sizes of current in the first time interval and the second time interval to a size of current during a normal operation exceeds a predetermined value.

In addition, it is possible to detect an occurrence of jam based on a difference between the average value of sizes of current sensed in the first time interval and the average value of sizes of current sensed in the second time interval. For example, it may be identified whether a jam has occurred according to whether a difference between the average value of the first time interval and the average value of the second time interval exceeds a predetermined value.

In addition, it is possible to identify an occurrence of jam based on a difference between a maximum value of a size of current sensed in the first time interval and a maximum value of a size of current sensed in the second time interval. For example, it may be identified whether a jam has occurred according to whether a difference between the maximum value of the first time interval and the maximum value of the second time interval exceeds a predetermined value.

Further, it is possible to compare a variance value of a size of current in the first time interval with a variance value of size of current in the second time interval, or compare a difference between a maximum value and minimum value of a size of current sensed in the first time interval with a maximum value and minimum value of a size of current sensed in the second time interval. In addition, it is possible to compare a difference between the maximum value of size of current sensed in the first time interval and an average value with the maximum value of a size of current sensed in the second time interval and an average value, and identify an occurrence of jam.

In addition, it is possible to identify a thickness of a printing medium input to a print engine based on the size of current sensed in the first time interval. In addition, it is possible to identify an occurrence of a jam based on the identified printing medium thickness and a size of current sensed in the second time interval. Alternatively, it is possible to identify an occurrence of a jam based on a ratio of the identified printing medium thickness to a ratio of the average of sizes of current sensed in the second time interval to a size of current during normal operation. Alternatively, it is possible to identify an occurrence of jam based on the identified printing medium thickness and a difference between an average value of the first time interval and an average value of the second time interval.

As described above, in the image forming method according to an example embodiment, it is possible to detect an occurrence of jam using sizes of currents measured in two intervals disposed at time intervals and thus, a processor may clearly distinguish a case a simple increase of load due to a change of a thickness of a printing medium or aging from a case of an actual jam.

In addition, the above-described method of controlling the image forming apparatus may be realized as at least one execution program to execute the above-described method for controlling the image forming apparatus as described above, and such an execution program may be stored in a non-transitory computer readable medium.

A non-transitory computer readable medium may refer to a machine-readable medium or device that stores data semi-permanently and not for a short period of time, such as a register, cache, memory, and the like. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

While the general inventive concept has been shown and described with reference to certain embodiments thereof, it will be understood by those skilled in the art that various changes in form and detail may be made therein without departing from the spirit and principles of the present general inventive concept, the scope of which is defined by the appended claims and their equivalents.

What is claimed is:

1. An image forming apparatus, comprising:
   a print engine to be used to perform an image forming job;

a motor to start the print engine;

a driving circuit to supply a power to the motor and to include a sensor to sense a size of current of the power supplied to the motor during an operation to perform the image forming job; and a processor to detect an occurrence of jam based on a size of current sensed by the sensor in a first time interval, among first time intervals, while the motor is driven to perform the operation, and a size of current sensed by the sensor in a second time interval, among second time intervals, after a determined time from the first time interval.

2. The image forming apparatus as claimed in claim 1, wherein the processor detects the occurrence of jam based on the size of current sensed in the first time interval, the size of current sensed in the second time interval, and a size of current during a normal operation as a reference operation to the operation.

3. The image forming apparatus as claimed in claim 2, wherein the processor detects the occurrence of jam based on a ratio of an average value of sizes of current sensed in the first time intervals to a size of current during the normal operation, and a ratio of an average value of sizes of current sensed in the second time intervals to the size of current during the normal operation.

4. The image forming apparatus as claimed in claim 1, wherein the processor:

identifies a thickness of a printing medium input to the print engine based on the size of current sensed in the first time interval; and detects the occurrence of jam based on the identified printing medium thickness and the size of current sensed in the second time interval.

5. The image forming apparatus as claimed in claim 4, wherein the processor:

calculates a ratio of an average value of sizes of current sensed in the second time intervals to a size of current during the normal operation; and detects the occurrence of jam based on the identified printing medium thickness and the calculated ratio.

6. The image forming apparatus as claimed in claim 1, wherein the processor detects the occurrence of jam based on a difference between first average value of sizes of current sensed in the first time intervals and second average value of sizes of current sensed in the second time intervals.

7. The image forming apparatus as claimed in claim 6, wherein the processor:

identifies a thickness of a printing medium input to the print engine based on the size of current sensed in the first time interval; and detects the occurrence of jam based on the identified printing medium thickness and the difference between the first and second average values.

8. The image forming apparatus as claimed in claim 1, wherein the second time interval refers to a time interval after a time point when a printing medium input to the print engine starts to pass through a fuser in the print engine.

9. A method to control an image forming apparatus, the method comprising:

a first sensing to sense a size of current of a power supplied to a motor in a first time interval, among first time intervals, while the motor is to drive a print engine to perform an operation to perform an image forming job;

a second sensing to sense a size of current provided to the motor in a second time interval, among second time intervals, based on a determined time after the first sensing; and identifying whether a jam occurred based on the size of current sensed in the first time interval and the size of current sensed in the second time interval.

10. The method as claimed in claim 9, wherein the identifying whether the jam occurred comprises identifying an occurrence of jam based on the size of current sensed in the first time interval, the size of current sensed in the second time interval and a size of current during a normal operation as a reference operation to the operation.

11. The method as claimed in claim 10, wherein the identifying whether the jam occurred comprises identifying the occurrence of jam based on a ratio of an average value of sizes of current sensed in the first time intervals to a size of current during the normal operation and a ratio of an average value of sizes of current sensed in the second time intervals to the size of current during the normal operation.

12. The method as claimed in claim 9, wherein the identifying whether the jam occurred comprises:

identifying a thickness of a printing medium input to the print engine based on the size of current sensed in the first time interval; and sensing the occurrence of jam based on the identified printing medium thickness and the size of current sensed in the second time interval.

13. The method as claimed in claim 9, wherein the identifying whether the jam occurred comprises sensing an occurrence of jam based on a difference between a first average value of sizes of current sensed in the first time intervals and a second average value of sizes of current sensed in the second time intervals.

14. The method as claimed in claim 13, wherein identifying whether the jam occurred comprises:

identifying a thickness of a printing medium input to the print engine based on the size of current sensed in the first time interval; and sensing the occurrence of jam based on the identified printing medium thickness and the difference between the first and second average values.

15. The method as claimed in claim 9, wherein the second time interval refers to a time interval after a time point when a printing medium input to the print engine starts to pass through a fuser in the print engine.

* * * * *